US012627655B2

(12) United States Patent
Grover et al.

(10) Patent No.: US 12,627,655 B2
(45) Date of Patent: May 12, 2026

(54) DYNAMIC BIOMETRIC COMBINATION AUTHENTICATION

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 387 days.

(21) Appl. No.: 17/687,211

(22) Filed: Mar. 4, 2022

(65) Prior Publication Data

US 2023/0283603 A1 Sep. 7, 2023

(51) Int. Cl.
*H04L 9/40* (2022.01)
*G06F 21/32* (2013.01)

(52) U.S. Cl.
CPC .......... *H04L 63/0861* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 10,037,528 B2 | 7/2018 | Gardiner | |
| 10,281,953 B2 | 5/2019 | Von Badinski | |
| 10,528,715 B2 | 1/2020 | Fukuda | |

| | | | | |
|---|---|---|---|---|
| 2004/0123115 | A1* | 6/2004 | Schuba | ................. H04L 9/3231 |
| | | | | 713/186 |
| 2005/0134427 | A1 | 6/2005 | Hekimian | |
| 2013/0104227 | A1* | 4/2013 | Dow | ..................... G06F 21/316 |
| | | | | 726/19 |
| 2014/0059673 | A1* | 2/2014 | Azar | ........................ H04N 7/18 |
| | | | | 726/19 |
| 2017/0011210 | A1 | 1/2017 | Cheong | |
| 2019/0188367 | A1* | 6/2019 | Fukuda | ................. G06V 40/13 |
| 2019/0222576 | A1* | 7/2019 | Borkar | ............... H04L 63/0884 |
| 2020/0120081 | A1* | 4/2020 | Sutrala | .................... G06F 21/46 |
| 2020/0384950 | A1* | 12/2020 | Takeyasu | ............... B60Q 1/247 |
| 2021/0075796 | A1* | 3/2021 | Cuan | .................... H04L 9/3271 |

FOREIGN PATENT DOCUMENTS

| | | |
|---|---|---|
| CN | 108697380 A | 10/2018 |
| CN | 208781239 U | 4/2019 |
| EP | 3073414 B1 | 7/2019 |

(Continued)

*Primary Examiner* — Moustafa M Meky
*Assistant Examiner* — Mohammad Yousuf A. Mian
(74) *Attorney, Agent, or Firm* — Sheridan Ross P.C.

(57) ABSTRACT

A request to authenticate a user is received. A random authentication pattern is generated. For example, the random authentication pattern may be for the user to provide a series of biometric scans and/or gesture scans. Instructions for the random authentication pattern are sent to a communication device (e.g., to a smartphone or smartwatch). A generated authentication pattern is received from the communication device. The generated authentication pattern is compared to a stored set of biometric scans and/or gestures scans that are based on the random authentication pattern. The user is authenticated based on the generated authentication pattern meeting a threshold by comparing the generated authentication pattern to the stored set of biometric scans and/or gestures scans.

20 Claims, 6 Drawing Sheets

(56)          References Cited

FOREIGN PATENT DOCUMENTS

| JP | 2003058508 | A | * | 2/2003 | ............... | G06K 9/00 |
| JP | 2018018324 | A | * | 2/2018 | | |
| JP | 2018128736 | A | * | 8/2018 | | |
| KR | 101796352 | | * | 12/2017 | ............ | G06F 18/00 |
| KR | 102194566 | B1 | | 12/2020 | | |
| KR | 20220026198 | | * | 3/2022 | ............ | G06F 21/32 |
| WO | WO-2020249889 | A1 | * | 12/2020 | ............ | G06F 21/34 |

* cited by examiner

From Step 302

To step 306

DYNAMIC BIOMETRIC COMBINATION AUTHENTICATION

FIELD

The disclosure relates generally to biometric authentication and particularly to dynamic biometric combination authentication.

BACKGROUND

A problem that exists with biometrics is that they are static and are not interactive. For example, traditional biometric scans are different from other authentication processes, such as, a password that can be changed or where a dynamic code is sent to the user's smartphone (e.g., via a Short Message Service (SMS) message). For traditional biometric scans, a single scan is taken, and the user is authenticated based on the scan. This makes biometrics easier to compromise if the biometric becomes hacked.

SUMMARY

These and other needs are addressed by the various embodiments and configurations of the present disclosure. The present disclosure can provide a number of advantages depending on the particular configuration. These and other advantages will be apparent from the disclosure contained herein.

A request to authenticate a user is received. A random authentication pattern is generated. For example, the random authentication pattern may be for the user to provide a series of biometric scans and/or gesture scans. Instructions for the random authentication pattern are sent to a communication device (e.g., to a smartphone or smartwatch). A generated authentication pattern is received from the communication device. The generated authentication pattern is compared to a stored set of biometric scans and/or gestures scans that are based on the random authentication pattern. The user is authenticated based on the generated authentication pattern meeting a threshold by comparing the generated authentication pattern to the stored set of biometric scans and/or gestures scans.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably, and include any type of methodology, process, mathematical operation or technique.

The term "means" as used herein shall be given its broadest possible interpretation in accordance with 35 U.S.C., Section 1.12(f) and/or Section 112 Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein and in the claims a "random authentication pattern" may include any type of biometric/gesture pattern. The random authentication pattern is a pattern/sequence of biometric type(s) and/or gesture patterns.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
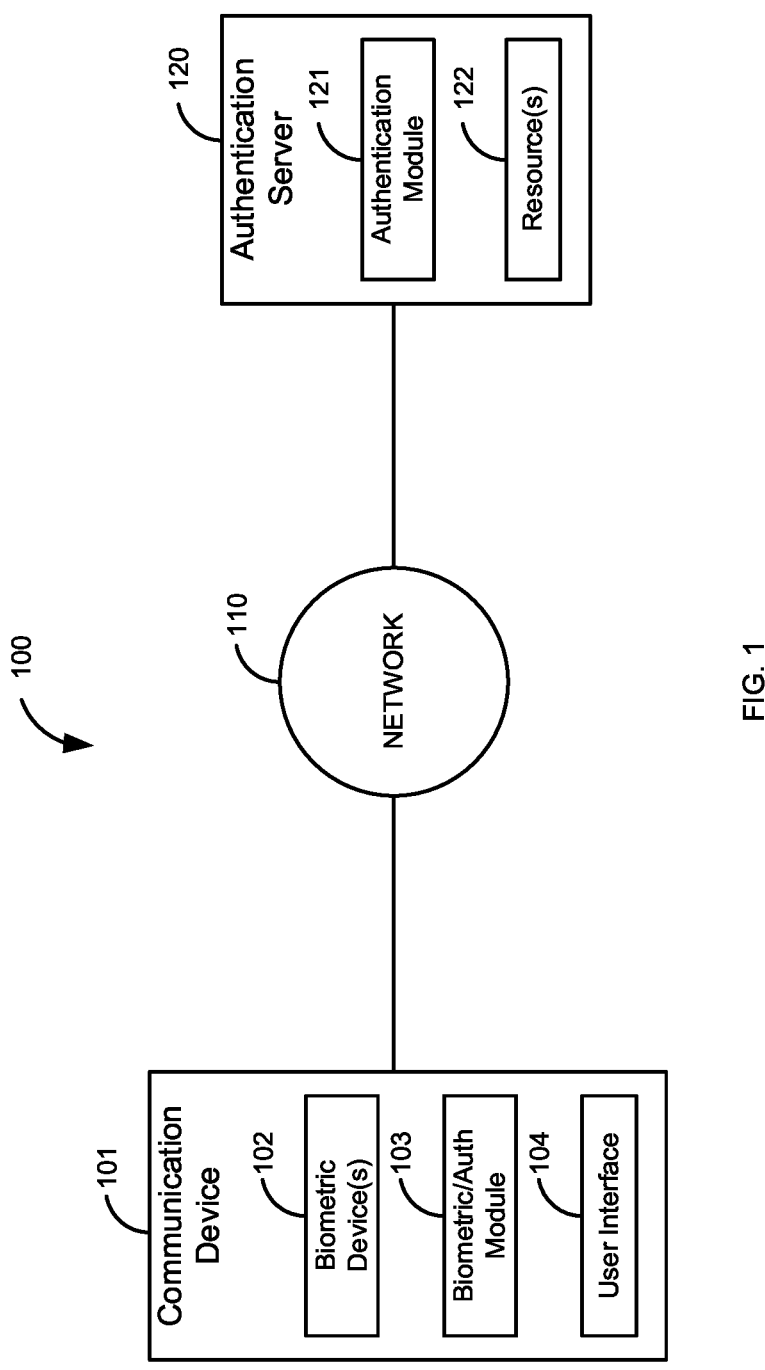
FIG. 1 is a block diagram of a first illustrative system for dynamic biometric combination authentication.

FIG. 1 is a block diagram of a first illustrative system 100 for dynamic biometric combination authentication. The first illustrative system 100 comprises a communication device 101, a network 110, and an authentication server 120.

The communication device 101 can be or may include any user device that can communicate on the network 110, such as a Personal Computer (PC), a telephone, a video system, a cellular telephone, a Personal Digital Assistant (PDA), a tablet device, a notebook device, a smartphone, a server, an access device, a security system, a control system, and/or the like. Although FIG. 1 only shows a single communication device 101, any number of communication devices may be connected to the network 110.

The communication device 101 further comprises biometric device(s) 102, a biometric authentication module 103, and a user interface 104. Although not shown for convenience, the communication device 101 may comprise other components/software, such as, a microprocessor, memory, an operating system, applications/resources, and/or the like.

The biometric device(s) 102 may comprise any number/type of biometric device(s) 102, such as, a fingerprint scanner, a palm scanner, an iris/rental scanner, a facial scanner, a wrist scanner, a finger scanner, a foot scanner, an ankle scanner, a body scanner, a camera, and/or the like. The biometric device(s) 102 may scan for various biometric features, such as, prints, pores, lines, scars, iris colors, age spots, follicle locations, distances (e.g., distances between features (e.g., between the eyes) in a facial scan), vein patterns, skin tone, heart rate, and/or the like The biometric authentication module 103 can be or may include any hardware coupled with software that can manage authentication using information from the biometric devices 102 to authenticate with the authentication server 120. The biometric authentication module 103 may receive input for other types of authentications, such as, getting usernames/passwords from the user interface 104, receiving Short Message Service (SMS) codes, receiving email codes, and/or the like.

The user interface 104 can be or may include various user interface devices, such as, monitor, a touchscreen, a mouse, a trackball, a speaker, a microphone, a keyboard, and/or the like. The user interface 104 takes input from the user and provides output to the user as part of the authentication process.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The authentication server 120 can be or may include any device that is used for granting access to the resource(s) 122, such as, a database server, a storage server, a network server, an application server, a communication device 101, and/or the like. The authentication server 120 further comprises an authentication module 121 and resource(s) 122.

The authentication module 121 is used to provide access to the resource(s) 122. The authentication module 121 may use various types of authentications, such as, username/ passwords, SMS messages, email messages, captchas, questions, biometrics, gestures, and/or the like. In one embodiment, the authentication module 121 may be in the communication device 101. For example, the authentication module 121 may be part of a smartwatch.

The resource(s) 122 may be any type of resource, such as, a database, an application, a service, a file system, a printer, a scanner, a camera, a communication device 101, a door lock, a security system, a smart appliance, an operating system, a container, a virtual machine, a cloud service, and/or the like. The resource(s) 122 may reside on the authentication server 120, on the communication device, 101, and/or on the network 110.

Figure 2:
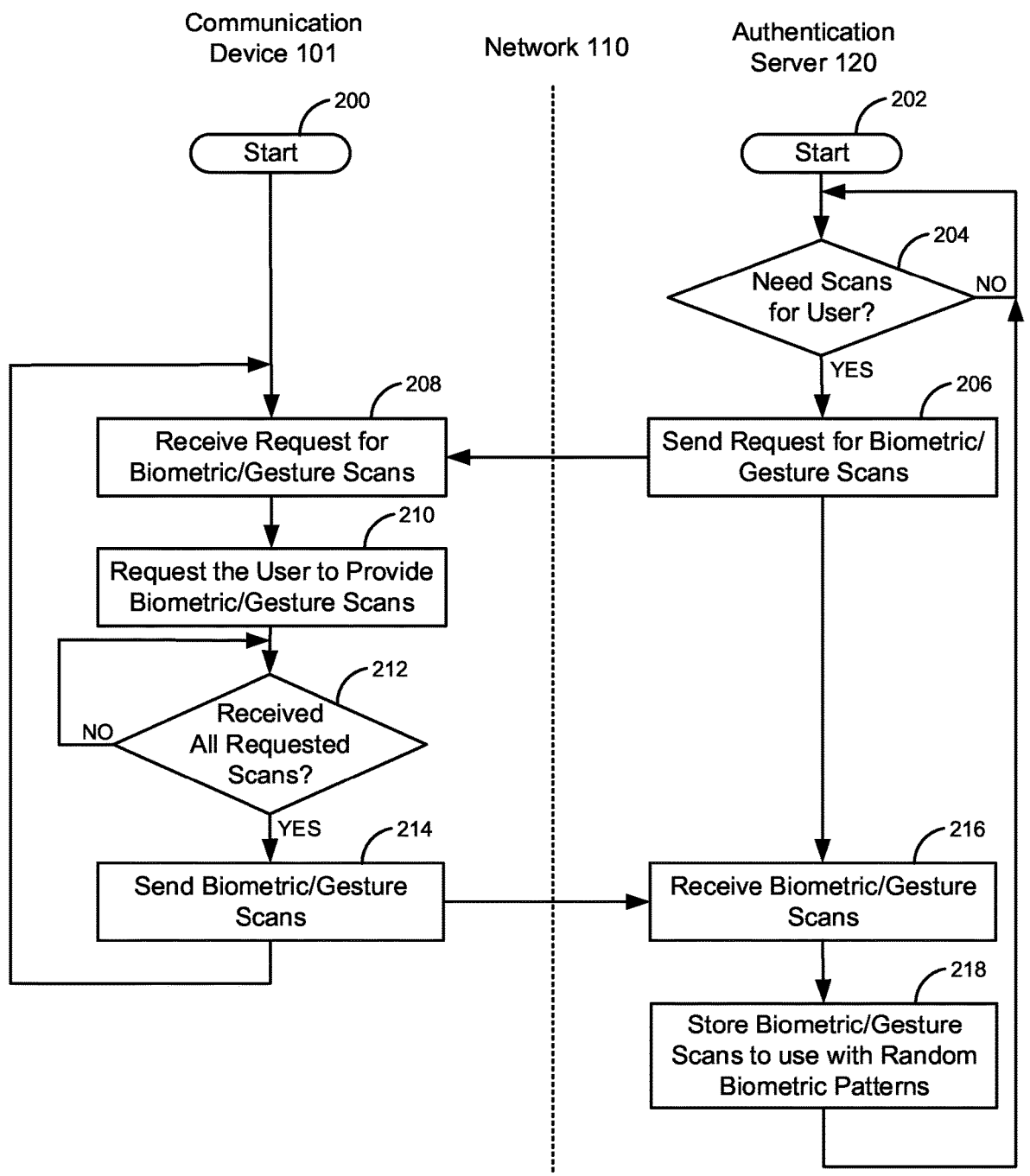
FIG. 2 is a flow diagram of a process for initially getting biometric scans/gesture scans from a user to use with dynamic biometric combination authentication.

FIG. 2 is a flow diagram of a process for initially getting biometric scans/gesture scans from a user to use with dynamic biometric combination authentication. Illustratively, the communication device 101, the biometric device (s) 102, the biometric authentication module 103, the user interface 104, the network 110, the authentication server 120, the authentication module 121, and the resource(s) 122 are stored-program-controlled entities, such as a computer or microprocessor, which performs the methods of FIGS. 2-6A-6E and the processes described herein by executing program instructions stored in a computer readable storage medium, such as a memory (i.e., a computer memory, a hard disk, and/or the like). Although the methods described in FIGS. 2-6A-6E are shown in a specific order, one of skill in the art would recognize that the steps in FIGS. 2-6A-6E may be implemented in different orders and/or be implemented in a multi-threaded environment. Moreover, various steps may be omitted or added based on implementation.

FIG. 2 shows the process of exchanging biometric scans/gesture scans that are used for authenticating the user. FIG. 2 shows the flow between the communication device 101 and the authentication server 120. The process on the communication device 101 starts in step 200. The process starts on the authentication server 120 (i.e., in the authentication module 121) in step 202. The authentication module 121 waits, in step 204, to see if there is a need to do biometric/gesture scans for a user. For example, the biometric/gesture scans may be needed based on adding a new user to the system. If there is not a need to do biometric/gesture scans for a user in step 204, the process repeats step 204. If there is a need to do biometric/gesture scans in step 204, the authentication module 121 sends a request for the biometric/gesture scans to the communication device 101 in step 206.

The communication device 101 (i.e., the biometric authentication module 103) receives the request for biometric/gesture scans in step 208. The biometric authentication module 103 requests, in step 210, the user to provide the biometric/gesture scans. The biometric authentication module 103 may provide instructions on the user interface 104 for the user to provide a series of biometric/gesture scans that will cover all potential combinations of biometrics/gestures that will be required for the dynamically generating the random biometric pattern. For instance, the request may be to capture ten different biometric scans and five different gesture scans that can be used in any combination.

The biometric authentication module 103, waits, in step 212, to receive all the requested scans. If not all the requested scans have been received, the process of step 212 repeats. Once all the necessary biometric/gesture scans have been received in step 212, the biometric authentication module 103 sends, in step 214, the captured biometric/gesture scans. In one embodiment, the biometric authentication module 103 may send individual biometric/gesture scans as they are received. The format of the biometric/gesture scans may be in any known format that is currently used for biometric/gesture scanning. The process on the communication device 101 then goes back to step 208.

The authentication module 121, receives, in step 216, the biometric/gesture scans. The authentication module 121, stores, in step 218, the biometric/gesture scans. For example, the biometric/gesture scans may be stored in a memory. The stored biometric/gesture scans (a set of scans) are used as a template for authenticating the random biometric patterns that are described herein. The process then goes to step 204.

This process can then be repeated for each user. The process can also be used to do additional scans for new biometrics/gestures or as part of a rescanning process.

In one embodiment, the process of FIG. 2 may only occur on the communication device 101. For example, the communication device 101 may be a smartwatch and the resource 122 may be the smartwatch. In this example, the process described in FIGS. 2-4 may all occur on the communication device.

Figure 3:
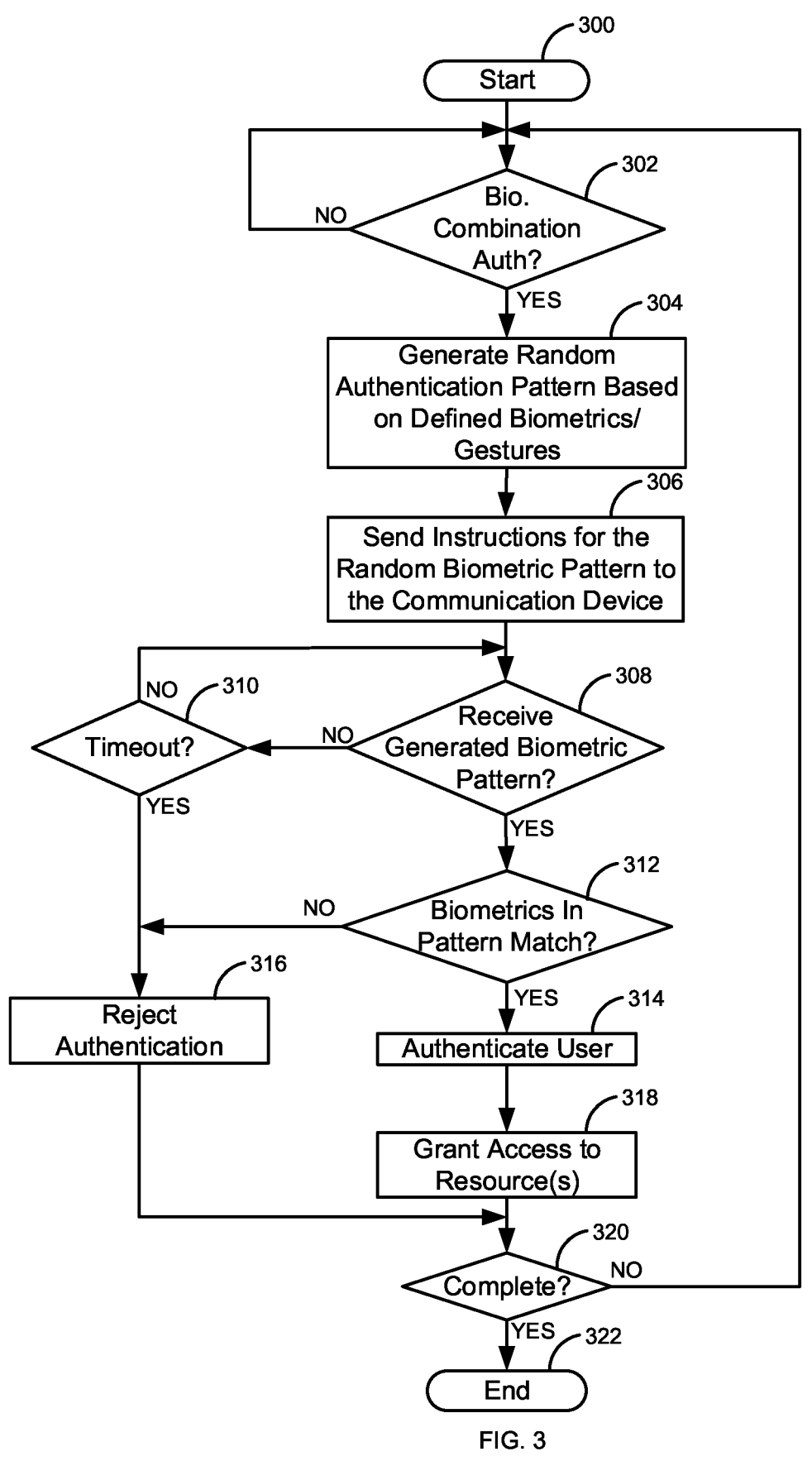
FIG. 3 is a flow diagram of a process for dynamic biometric combination authentication.

FIG. 3 is a flow diagram of a process for dynamic biometric combination authentication. The process of FIG. 3 is shown from the perspective of the authentication server 120. The process of FIG. 3 assumes that the authentication server 120 has received the necessary biometric/gesture scans as described in FIG. 2 to identify a biometric pattern/series of gestures.

The process starts in step 300. When the user wants to authenticate, the user, via the user interface 104/biometric devices 102/biometric authentication module 103 initiates the authentication process. While FIG. 3 discusses dynamic biometric combination authentication, other types of authentications may be used in conjunction with the dynamic biometric combination authentication, such as, usernames/passwords, SMS codes, email codes, questions, captchas, and/or the like.

The authentication module 121 waits, in step 302, to receive a message from the biometric authentication module 103 to initiate a dynamic biometric combination authentication. For example, the user may request to login to the authentication server 120 to access the resource 122. Once an authentication request is received in step 302, the authentication module 121 generates a random authentication pattern based on the stored biometric/gesture scans in step 304.

The random authentication pattern may be based on various factors, such as, a type of communication device 101. For example, if the communication device 101 is a smartwatch, the random authentication pattern may be a combination of movements of the smartwatch on the user's wrist (described in more detail in FIGS. 5-6). If the communication device 101 only has a camera, the authentication pattern may be a facial scan and a combination of gestures.

The random authentication pattern may be based on one or more rules. The one or more rules may be administered. For example, the rules may define a required number of biometric combinations, a range for the number of required random biometric combinations, a type(s) of required biometric(s) used in the random authentication pattern, available biometric devices 102 (e.g., what biometric devices 102 are on the communication device 101), and/or the like.

The rules may vary based on the user. The rules for a superuser (a type of user) may require a higher number/length of authentication patterns/biometric types to authenticate the user versus a non-superuser (a different type of user). For example, the superuser may be required to have six different biometric scans versus the non-superuser only having to provide four different biometric scans.

To illustrate, consider some exemplary embodiments. The random authentication pattern may be a facial scan and then a series of gestures, such as, a having the user touch their nose, touch their left ear, touch their right ear, touch their lips, etc. The process can also require the use of different hands. For example, the user must touch their nose with their left hand, then their right ear with their right hand, etc. The sequence could also require touching places other than the face, such as the user's left shoulder or neck (right side, left side, and/or center). It could include the hands as well. For example, the action may be to touch both thumbs together or a touch a combination of fingers (e.g., all of the user's fingers) together in front of the camera.

The random authentication pattern may comprise different types of biometrics. For example, the random authentication pattern may comprise a fingerprint scan of the right thumb, an iris scan of the left eye, a fingerprint scan of the left index finger, and an iris scan of the right eye. The random authentication pattern may use the same type of biometric. For example, random authentication pattern may be combination of different fingerprints or to have the user take scans of the same finger that is rotated to different positions (e.g., the top, the left side, the right side, and/or the bottom). In another embodiment, the random authentication pattern may use a facial scan where the user takes images of different sides of the face/back of the head according to random authentication pattern. The combinations could be combined with a smartwatch process.

In one embodiment, the random authentication pattern may change each time the user authenticates. The characteristics of the random authentication pattern may change each time the user authenticates. For example, for the first authentication, the user may have to do a series of fingerprint scans. For the second authentication, the same user may have to do a facial scan and a series of gestures. For the third authentication the user may have to do a combination of fingerprint scans/facial scans/gestures.

The term "random" in regard to the random authentication pattern may include a semi-random authentication pattern. For example, the randomness of the pattern may change periodically or based on a number of authentications.

The authentication module 121, sends, in step 306, instructions for the random biometric pattern to the communication device 101. The communication device 101 then displays the instructions for the random biometric pattern to the user. For example, the instructions may be similar to those shown in FIG. 5. The user then follows the instructions so that the biometric device(s) 102 capture the biometric(s)/ gestures. On completion, the random biometric pattern of scans is sent to the authentication server 120 by the communication device 101.

The authentication module 121 waits, in step 308, to receive a generated biometric pattern from the communication device 101 (i.e., generated by the biometric device(s) 102). If the generated biometric pattern has not been received in step 308, the authentication module 121 determines, in step 310, if a timeout has occurred. If a timeout has not occurred in step 310, the process goes back to step 308. Otherwise, if a timeout has occurred in step 310, the authentication is rejected in step 316 and the process goes to step 320.

If the generated biometric pattern has been received in step 308, the authentication module 121 compares, in step 312, the generated biometrics to the stored set of biometric scans and/or gestures (stored in step 218) that are based on the random authentication pattern. The stored biometric scans are taken prior the user initiating the authentication process. For example, the user may be asked to take a fingerprint scan (e.g., scans of each finger/thumb), a facial scan, an iris scan, make specific gestures, and/or the like. The comparison may be based on a threshold. For example, the threshold may be based on a number of minutia points, a number of pores in defined locations, a comparison of colors in an iris scan, and/or the like. If the received generated biometrics/gesture scans do not match the random authentication pattern, the authentication is rejected in step 316. Otherwise, if the generated biometric patten matches the stored set of biometric scans and/or gestures that are based on the random authentication pattern, the user is authenticated in step 314. The user is granted access to the resource(s) 122 in step 318. For example, the user is granted access to a financial application.

The authentication module 121 determines, in step 320, if the process is complete. If the process is not complete in step 320, the process goes back to step 302. Otherwise, if the process is complete in step 320, the process ends in step 322.

The process of FIG. 3 may also use other information as part of the authentication process, such as, location information, heart rate, etc. For example, if the received biometric pattern is valid, but the user's heart rate is much higher than normal, this may indicate that the user is being forced to authenticate by a bad actor. In this example, the authentication may be denied and/or flagged. Likewise, location information may be used as a factor in the authentication process. For example, Global Positioning Satellite (GPS) information of the communication device 101, in addition to the valid received biometrics, must match the location of car (a resource 122) before access is granted to the car.

The process may incorporate other techniques to verify that the user is a live user. For example, infrared scanning/ active pulse may also be used as another factor in the authentication process.

The analysis process of FIG. 3 may use machine learning to detect a playback attack. With biometrics, the captured data points (e.g., pore locations/minutia points) typically vary for each scan as compared to the original scan or a previous scan. Instead of an exact match, thresholds are used to authenticate a biometric scan. For a playback attack the data points will not vary. With this process, there will be variances in some or all the scans. Thus, if each of the scans has the same data points, the machine learning process can detect a playback attack.

In one embodiment, the process of FIG. 3 may occur in the communication device 101. In this embodiment, the instructions of step 306 are sent directly to the user interface 104 and the received biometric pattern of steps 308/312 is compared on the communication device.

Figure 4:
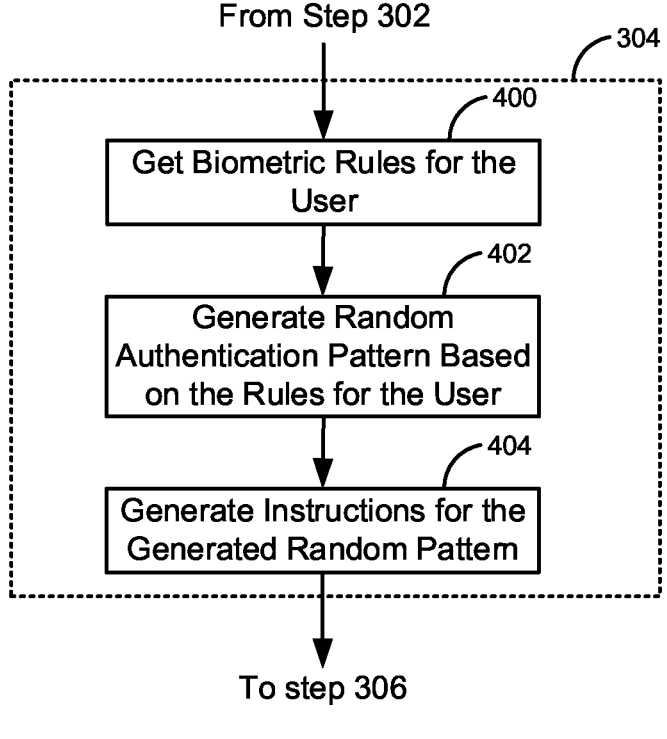
FIG. 4 is a flow diagram of a process for determining a random authentication pattern based on rules.

FIG. 4 is a flow diagram of a process for determining a random authentication pattern based on rules. The process of FIG. 4 is an exemplary embodiment of step 304. After receiving a request for a dynamic biometric combination authentication in step 302, the authentication module 121, gets, in step 400, rules for the user. The rules may be applied on a group basis, on an individual user basis, or on at a global basis. The rules may be similar to those discussed above in FIG. 3.

The authentication module 121 generates the random authentication pattern based on the rules in step 402. Based on the generated random authentication pattern, the authentication module 121 generates instructions for the generated random pattern. For example, based a required order of the generated random pattern, the instructions are generated to tell the user to follow the instructions to generate the required biometric pattern. The process then goes to step 306.

Figure 5:
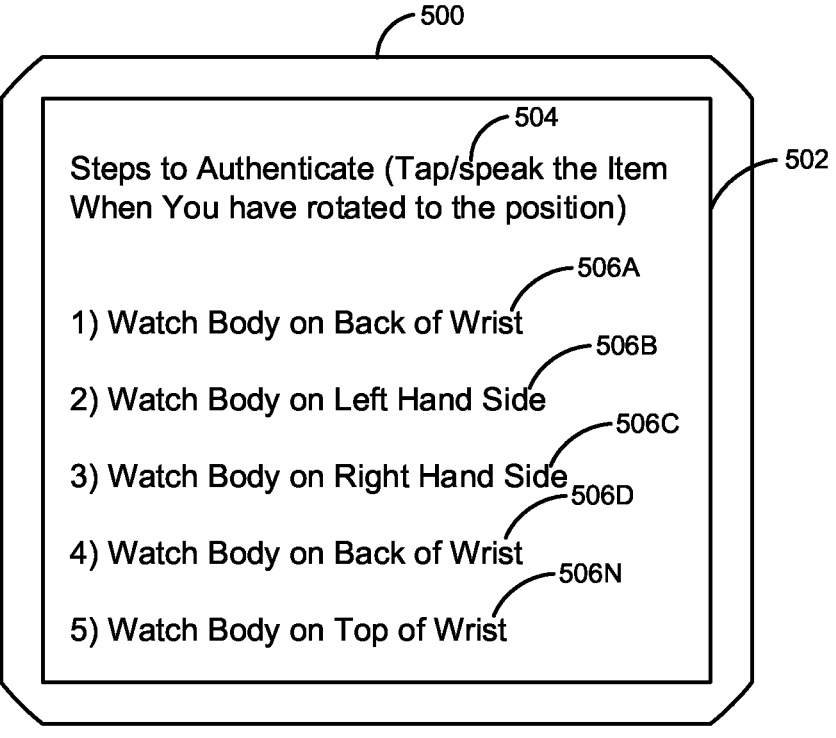
FIG. 5 is a diagram of a smartwatch that is used for dynamic biometric combination authentication.

FIG. 5 is a diagram for a smartwatch 500 that is used for dynamic biometric combination authentication. The smartwatch comprises a display 502, an authentication steps field 504, a first step field 506A, a second step field 506B, a third step field 506C, a fourth step field 606D, and a last step field 506N.

The smartwatch may be any type, size, shape of watch that a user wears on their wrist. In addition, the smartwatch 500 may be a smart ring, a smart bracelet, a smart belt, and/or the like. For example, if the smartwatch is a ring, the biometric scans will be a series of images of the of the user's finger. For an ankle bracelet, the image will be of the user's ankle. For a smart belt, the image would be of the user's torso.

The display 502 may be any kind of display that can be incorporated into the smartwatch, such as, a Liquid Crystal Display (LCD), a Light Emitting Diode (LED) display, a plasma display, and/or the like. The display 502 may be a touchscreen display. The display 502 is used to display messages/instructions to the user and receive input from the user.

The steps field 504 has instructions of the steps required to authenticate the user. In FIG. 5, the steps field 504 instructs the user of the steps required to authenticate and to tap/speak when the smartwatch is in the correct position. The first step field 506A tells the user to move the "Watch Body to Back of the Wrist". The second step field 506B tells the user to move the "Watch Body on Left Hand Side". The third step field 506C tells the user to move the "Watch Body on Right Hand Side". The fourth step field 506D tells the user to move the "Watch Body on the Back of the Wrist". The last step field 506N tells the user to move the "Watch Body on Top of Wrist."

FIGS. 6A-6E are diagrams of how a smartwatch 500 is used for dynamic biometric combination authentication. FIGS. 6A-6E are all shown from the perspective of the top of the wrist 602. Each of the FIGS. 6A-6E show the smartwatch 500, a watchband 600, and the top of the wrist 602.

Figures 6A, 6B, 6C, 6D, 6E:
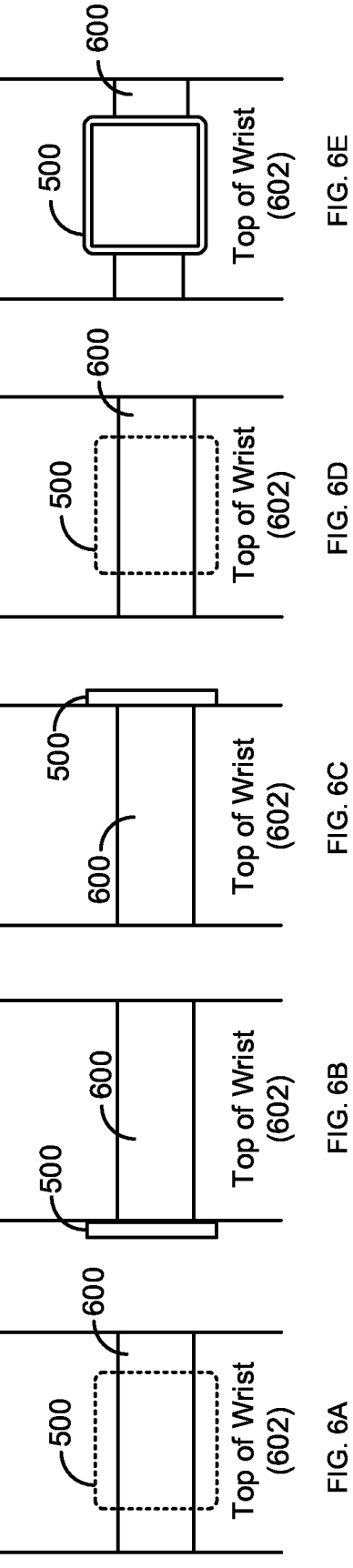
FIGS. 6A-6E are diagrams of how a smartwatch is used for dynamic biometric combination authentication.

FIG. 6A shows where the smartwatch 500 is located on the back of the wrist per the instructions in the first step field 506A. FIG. 6B shows where the smartwatch 500 is located on the left-hand side of the wrist per the instructions in the second step field 506B. FIG. 6C shows where the smartwatch 500 is located on the right-hand side of the wrist per the instructions in the third step field 506C. FIG. 6D shows where the smartwatch 500 is located on the back of the wrist per the instructions in the fourth step field 506D. FIG. 6E shows where the smartwatch 500 is located on the top of the wrist 602 per the instructions in the last step field 506N.

After viewing the display 502, the user then rotates the smartwatch to positions indicated by the displayed instructions in the fields 506A-506N. For example, for step 1, the user will move smartwatch 500 to the back of the wrist as shown in FIG. 6A. The user then moves the smartwatch 500 to the position as shown in FIG. 6B (the left-hand side), then as shown FIG. 6C (the right-hand side), then as shown in FIG. 6D (the back of the wrist), and then to the top of the wrist 602 shown in FIG. 6E. The authentication process provides a human interaction, a pattern dynamic of multiple positions, and biometric scans for each position to authenticate the user.

The process may also use direction information like a combination lock. For example, the user must rotate the smartwatch 500 right between steps 1 and 2, right between steps 2 and 3, and left between steps 4 and 5. The direction could apply to any of the steps or the beginning of the process. The process could include a full or several rotations between steps. An accelerometer (not shown) can be used to identify the direction.

The user may be able to check off each change of position by selecting the individual steps in order as shown in FIG. 5 using a touchscreen (i.e., display 502). In one embodiment, the smartwatch 500 may only show one step at a time. When the user rotates the smartwatch 500 to the correct position, the user can then check off the step by touching the smartwatch 500/button. After checking off a step, the next step is displayed. This process is repeated until all the steps have been completed. In one embodiment, the user may vocally check off each step. Alternatively, the user may check off each of the steps out of order.

The smartwatch 500 may provide feedback to the user to indicate that the smartwatch is in the correct position. For example, a color of the display may change, an audio indication may be provided, a text indication may be provided, and/or the like. The identified position may be based learned on location information of the wrist. For example, the muscle/bone patterns of the top/bottom of the wrist are different. Thus, the smartwatch 500 can know the position of the smartwatch 500 on the user's wrist regardless of who is using the smartwatch 500 (this could be pre-programmed into the smartwatch). This process can also determine which hand is being used. In this embodiment, because the process does not use the biometric scan to identify the position, the position information can be identified without compromising the security that is derived from the biometric scan at the various positions.

The idea ties the use of a biometric(s) to a random pattern for authenticating a user. In one embodiment, a smartwatch 500 is used where the smartwatch 500 initially takes a circular image of the user's wrist. The circular image is then divided into areas. For example, the wrist may be divided into four areas: the top, the left-hand side, the back, and the right-hand side as described in FIGS. 5-6A-6E. While this example has four sides, the process is not limited to four areas. For example, there may be eight areas (top, bottom, 2 sides, and 4 corners).

Each of these areas has a biometric image/data point pattern associated with the area. For example, a vein pattern, a pore pattern, a follicle pattern, a wrinkle pattern, a skin spot pattern, and/or the like may be created based on the captured image for each area.

The smartwatch authentication process may be to access the smartwatch 500 (i.e., the resource is the smartwatch 500), access an application, access a system, access a network 110, open a door, unlock a car, sign/initiate a transaction, and/or the like.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that can supply and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

Several variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to standards and protocols, the disclosure is not limited to such standards and protocols. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges or steps are disclosed herein, and without intending to publicly dedicate any patentable subject matter.

What is claimed is:

1. A system comprising:

a microprocessor; and a computer readable medium, coupled with the microprocessor and comprising microprocessor readable and executable instructions that, when executed by the microprocessor, cause the microprocessor to:

receive a request to authenticate a user;

generate a random authentication pattern, wherein the random authentication pattern comprises a dynamic combination of at least one biometric scan and at least one gesture scan;

send instructions for the random authentication pattern;

receive a generated authentication pattern;

compare the generated authentication pattern to a stored set of biometric scans that are based on the random authentication pattern;

authenticate the user based on the generated authentication pattern meeting a threshold using the stored set of biometric scans; and detect an attack when at least one of the at least one biometric scan and the at least one gesture scan exhibits a lack of variation in data points relative to a previous biometric scan and/or a previous gesture scan for the user, wherein the lack of variation is identified by a machine learning process as indicative of a playback attack.

2. The system of claim 1, wherein the random authentication pattern changed based on a number of authentications.

3. The system of claim 1, wherein instructions for the random authentication pattern are sent to a communication device via a network, wherein the received generated authentication pattern is received from the communication device via the network, and wherein the random authentication pattern is generated based, at least partially, on a type of the communication device associated with the request to authenticate the user.

4. The system of claim 3, wherein the communication device is a smartwatch and wherein the instructions for the random authentication pattern are for a series of biometric scans at different locations on a wrist of the user.

5. The system of claim 1, wherein the random authentication pattern includes direction information.

6. The system of claim 3, wherein the communication device comprises a fingerprint scanner and wherein the instructions for the random authentication pattern are for a series of biometric scans of one or more fingers and/or locations on the one or more fingers.

7. The system of claim 3, wherein the communication device comprises a camera and wherein the instructions for the random authentication pattern comprise a facial scan and one or more gesture scans.

8. The system of claim 3, wherein the generated authentication pattern is based on biometric types supported by the communication device.

9. The system of claim 1, wherein a length of the generated authentication pattern is different based on a type associated with the user.

10. A method comprising:

receiving, by a microprocessor, a request to authenticate a user;

generating, by the microprocessor, a random authentication pattern, wherein the random authentication pattern comprises a dynamic combination of at least one biometric scan and at least one gesture scan;

sending, by the microprocessor, instructions for the random authentication pattern;

receiving, by the microprocessor, a generated authentication pattern;

comparing, by the microprocessor, the generated authentication pattern to a stored set of biometric scans that are based on the random authentication pattern; and authenticating, by the microprocessor, the user based on the generated authentication pattern meeting a threshold using the stored set of biometric scans; and detecting, by the microprocessor, an attack when at least one of the at least one biometric scan and the at least one gesture scan exhibits a lack of variation in data points relative to a previous biometric scan and/or a previous gesture scan for the user, wherein the lack of variation is identified by a machine learning process as indicative of a playback attack.

11. The method of claim 10, wherein the random authentication pattern changes based on a number of authentications.

12. The method of claim 10, wherein the instructions for the random authentication pattern are sent to a communication device via a network, wherein the received generated authentication pattern is received from the communication device via the network, and wherein the random authentication pattern is generated based, at least partially, on a type of the communication device associated with the request to authenticate the user.

13. The method of claim 12, wherein the communication device is a smartwatch and wherein the instructions for the random authentication pattern are for a series of biometric scans at different locations on a wrist of the user.

14. The method of claim 13, wherein the random authentication pattern includes direction information.

15. The method of claim 12, wherein the communication device comprises a fingerprint scanner and wherein the instructions for the random authentication pattern are for a series of biometric scans of one or more fingers and/or locations on the one or more fingers.

16. The method of claim 12, wherein the communication device comprises a camera and wherein the instructions for the random authentication pattern comprise a facial scan and one or more gesture scans.

17. The method of claim 12, wherein the generated authentication pattern is based on biometric types supported by the communication device.

18. The method of claim 10, wherein a length of the generated authentication pattern is different based on a type associated with the user.

19. A communication device comprising:

a microprocessor; and a computer readable medium, coupled with the microprocessor and comprising microprocessor readable and executable instructions that, when executed by the microprocessor, cause the microprocessor to:

receive a request to authenticate a user;

generate a random authentication pattern, wherein the random authentication pattern comprises a dynamic combination of at least one biometric scan and at least one gesture scan;

receive, based on the random authentication pattern, a generated set of biometric scans from the user;

authenticate the user based on the generated set of biometric scans meeting a threshold using a stored set of biometric scans; and detect an attack when at least one of the at least one biometric scan and the at least one gesture scan exhibits a lack of variation in data points relative to a previous biometric scan and/or a previous gesture scan for the user, wherein the lack of variation is identified by a machine learning process as indicative of a playback attack.

20. The communication device of claim 19, wherein the communication device is a smartwatch.

\* \* \* \* \*